(12) United States Patent
Cauchi

(10) Patent No.: US 6,377,166 B1
(45) Date of Patent: Apr. 23, 2002

(54) OMNI-DIRECTIONAL MOVEMENT SENSOR

(76) Inventor: Joseph Cauchi, 106 Gourlay Road, Sydenham, Victoria 3038 (AU)

( * ) Notice: Subject to any disclaimer, the term of this patent is extended or adjusted under 35 U.S.C. 154(b) by 0 days.

(21) Appl. No.: 09/462,721

(22) PCT Filed: Jul. 15, 1998

(86) PCT No.: PCT/AU98/00556

§ 371 Date: Jan. 12, 2000

§ 102(e) Date: Jan. 12, 2000

(87) PCT Pub. No.: WO99/04272

PCT Pub. Date: Jan. 28, 1999

(30) Foreign Application Priority Data

Jul. 17, 1997 (AU) ............................................. PO8091

(51) Int. Cl.$^7$ ............................................. B60R 25/10
(52) U.S. Cl. .................... 340/429; 340/545.3; 340/549; 340/566; 340/669; 340/689
(58) Field of Search ................................. 340/429, 440, 340/566, 540.3, 555, 556, 557, 669, 670, 671, 686.1, 689

(56) References Cited

U.S. PATENT DOCUMENTS

| | | | | | |
|---|---|---|---|---|---|
| 4,565,010 A | * | 1/1986 | Herman | ......................... | 33/366 |
| 4,648,273 A | * | 3/1987 | Ozols | ..................... | 73/516 LM |
| 4,866,850 A | * | 9/1989 | Kelly et al. | .................... | 33/366 |
| 4,952,908 A | * | 8/1990 | Sanner | ......................... | 340/429 |
| 5,183,056 A | * | 2/1993 | Dalen et al. | ................. | 128/782 |
| 5,608,209 A | * | 3/1997 | Matsuda | ..................... | 250/221 |
| 5,736,923 A | * | 4/1998 | Saab | .......................... | 340/429 |
| 5,805,056 A | * | 9/1998 | Mueller et al. | ............. | 340/426 |
| 6,043,734 A | * | 3/2000 | Mueller et al. | ............. | 340/429 |

* cited by examiner

Primary Examiner—Nina Tong
(74) Attorney, Agent, or Firm—Cantor Colburn LLP

(57) ABSTRACT

A movement sensor has a spherical body freely movable within a chamber. Radiation is passed through the chamber from at least two different sources. Detectors opposite the radiation sources produce signals responsive to the amount of detected radiation which is dependent on the position of the spherical body relative to the chamber.

16 Claims, 2 Drawing Sheets

OMNI-DIRECTIONAL MOVEMENT SENSOR

BACKGROUND OF THE INVENTION

This invention relates to a movement sensor and relates particularly to a device for detecting movement or variations of movement of a body.

Movement sensors are used in a variety of applications. In some applications, the movement sensors are designed to detect movement in a predetermined direction. In other applications, the movement sensors are designed to detect movement in more than one direction. The present invention is directed particularly at omni-directional movement sensors and will be described with particular reference to the use of such a sensor in a motor vehicle security and alarm system.

DESCRIPTION OF THE PRIOR ART

Various forms of movement sensors are available. For example, a mercury switch is a form of movement sensor commonly used in motor vehicle alarm systems and which operates when mercury moves from an at-rest position due either to acceleration of the switch, resulting from vehicle movement, or tilting of the switch. However, the known movement sensors suffer a number of inherent disadvantages.

The mercury switch, for example, can be set to detect acceleration and movement from a horizontal plane. However, as the switch is reliant on the gravitational effect on the mercury, the switch will not necessarily function as designed if its operating attitude is not substantially horizontal.

Another type of movement sensor works on the pendulum principal, where movement causes a suspended magnet to swing above a "Hall Effect" device thereby generating a signal in response to detected movement. A restriction with this sensor is that it only works on a horizontal plane.

Another known sensor uses a piezoelectric transducer wherein an acceleration or a sharp movement causes a piezoelectric material to generate an electrical signal. Even though this type of sensor is unaffected by its orientation, it is very susceptible to vibration but is not sensitive enough to detect small accelerations or slow variations in movement.

U.S. Pat. No 4,648,273 discloses a device for detecting the influence of gravitational forces on a flowable body contained within a cavity. The device is designed particularly for use in rocketry and space flight programming and instrumentation. However, the device is designed particularly to not only measure acceleration but to determine the state of zero gravity at which time the flowable material forms a sphere due to the surface tension of the medium.

Japanese Patent Abstract No 59-202067 (Mitsubishi Denki KK) discloses a three-axial direction acceleration detecting apparatus which includes a sphere supported by springs within a hollow container. Acceleration of the container causes the sphere to move relative thereto and that movement is detected by a light source on each of the yawing, rolling and pitching axes.

Japanese Patent Abstract No JP 6-258336 relates to an acceleration sensor which uses a liquid metal ball within a sphere. Shadows of the liquid ball are projected onto multi-element photo detectors. Acceleration causes the ball to deform in shape and the change in the shape of the shadow is measured as a function of the acceleration.

Japanese Patent Abstract No JP 6-258337 shows a sensor in which movement is detected by sensing changes to the size of the shadow of a ball within a sphere and detecting the shadow position using a multi-element photo detector.

SUMMARY OF THE INVENTION

It is therefore desirable to provide an improved movement sensor which has a number of applications but is particularly useful in motor vehicle security and alarm systems.

It is also desirable to provide a movement sensor which is able to detect movement in or variations in the motion of a body.

It is also desirable to provide a movement sensor which is relatively simple and economic to manufacture.

It is also desirable to provide a movement sensor which is reliable in operation.

According to one aspect of the invention there is provided a movement sensor including a chamber containing a spherical body freely movable within the chamber, radiation emitting means located relative to the chamber so that emitted radiation passes through the chamber, radiation detecting means to detect emitted radiation passing through the chamber, and signal generating means to generate a signal in response to detected radiation.

Preferably, the chamber is a spherical shape and has a relatively smooth inner surface which offers minimal resistance to movement of the spherical body within the chamber. If desired, the chamber may be evacuated, or partially evacuated, to further reduce resistance to movement of the body within the chamber.

The radiation emitting means may comprise a light source or a source of infra-red or any other suitable form of radiation including ultrasound. For simplicity, however, the invention will be described with reference to the radiation emitting means as a source of visible light.

The radiation detecting means preferably comprises a light detector which incorporates signal generating means so as to generate a signal proportional to the amount of detected light. Electrical circuitry is used to compare the output signal from the light detector with the input to the light source and detect any variation produced by movement of the body within the chamber which changes the amount of radiation passing through the chamber.

In one form of the invention, the chamber wall is formed of a material through which the radiation passes. Thus, the chamber may be formed of a synthetic plastics material which is transparent to the radiation. In a particular embodiment, the wall is formed of a material which is translucent to visible light but transparent to infra-red radiation.

In another form of the invention the chamber is provided with windows in the wall on opposite sides of the chamber which windows are transparent to the radiation. The radiation emitting means is located at one window and the radiation detecting means is located at the other window. In one preferred form, four windows are provided in the chamber wall with two radiation detecting means and two radiation emitting means so located at the windows that the radiation beams extend across the chamber, preferably at right angles to each other.

In a most preferred embodiment, six windows are provided in the chamber wall equally spaced from each other. Three radiation emitting devices are located at three of the windows and three radiation detecting devices are located at the other windows. The emitting and detecting devices are so located that the radiation beams extend at right angles to each other.

A movement detector having the two or more emitting and detecting means can be associated with electrical circuitry to firstly detect relative movement between the chamber and the body and secondly determine the extent and direction of acceleration of the chamber. The electrical circuitry receives signals from the detecting devices and compares the signals with the input to the emitting devices. The results of the comparison and then compared with each other and the circuitry is then able to determine whether or not there has been any change from an existing state and, if so, the rate and direction of change. The detector of the invention is therefore able to provide precise determination and calculation of movement of the body relative to the chamber.

In order that the invention is more readily understood, one embodiment thereof will now be described with reference to the accompanying drawing.

DESCRIPTION OF THE PREFERRED EMBODIMENT

Figure 1:
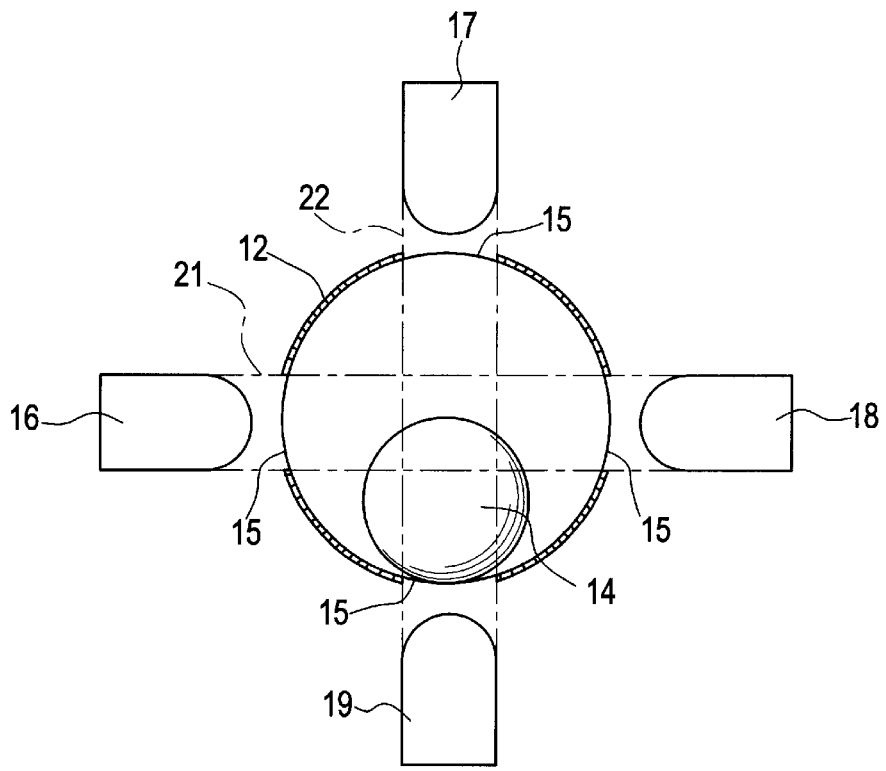
FIG. 1 is a top view of a movement detector in accordance with an embodiment and FIG. 2 is side view of the movement detector of FIG. 1.

Referring to the drawings, the movement detector of this embodiment comprises a hollow, spherical chamber 12 containing a spherical ball 14. The chamber 12, which may be formed of any suitable material such as metal or synthetic plastics material, may be evacuated or partly evacuated. The spherical ball may also be formed of any suitable material including metal, synthetic plastics material, wood or any other relatively rigid material which is able to block radiation emitted from a radiation emitter.

A radiation emitter 16, which, in this embodiment, is a light source, is located on one side of the chamber 12 and a second emitter 19 is located at 90° to the emitter 16. A radiation detector 18, which may be a photosensor, is located on the opposite side of the chamber 12 from the emitter 16 and a second detector 17 is located opposite the emitter 19.

The chamber wall is provided with windows 15 which are transparent to the emitted radiation, i.e. visible light, so that the radiation beams 21 and 22, which are preferably parallel beams, can pass through the chamber 12.

When the chamber 12 is at rest, or is moving horizontally with uniform velocity in a normal gravitational field, the ball 14 will remain in the position shown in FIG. 1. In that "at-rest" position, the ball 14 blocks all the light emitted by the emitter 19 so that the detector 17 will not receive any light. The ball will also block a proportion of the light emitted by the emitter 16 so that the detector 18 will detect only a portion of the total light emitted.

On movement or acceleration of the chamber 12, the ball 14 moves within the chamber. The amount of relative movement between the ball 14 and the chamber 12 depends on the acceleration of the chamber 12 and the inertia of the ball 14. The direction of the acceleration of the chamber 12 will also determined in which direction the ball moves relative to the chamber. Such relative movement of the ball 14 and chamber 12 will cause a variation in the amount of light blocked by the ball 14 and, therefore, in the amount of light received by the two detectors 17 and 18. If the ball 14, for example, moves to the left as viewed in FIG. 1, the amount of light received by the detector 18 will be reduced, as the ball moves relatively upwardly across the light beam 21, while the amount of light received by the detector 17 will increase as the light beam 22 becomes exposed.

Figure 2:
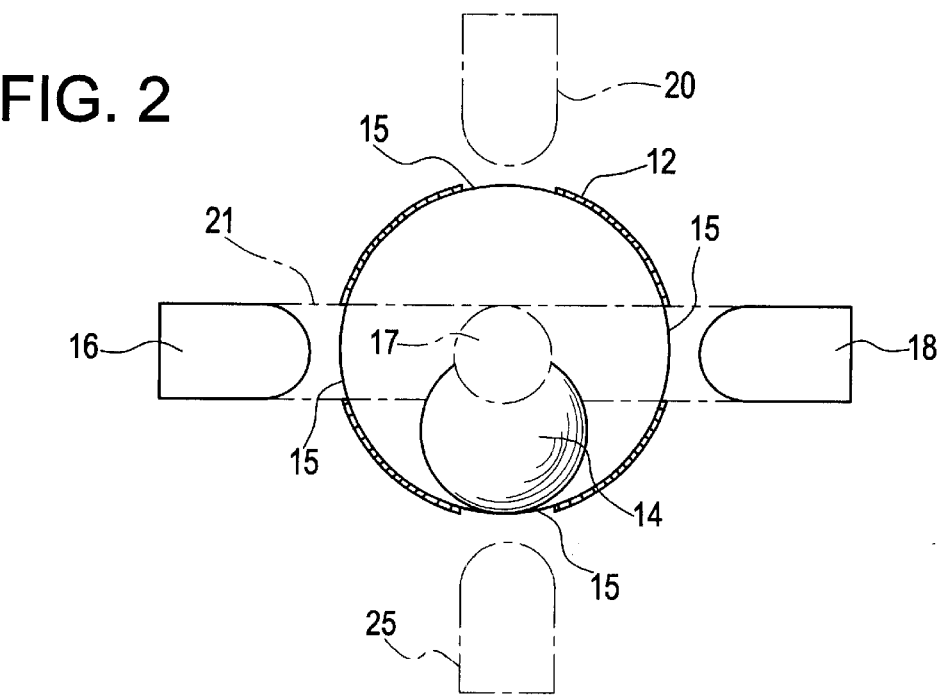

As shown in dotted outline in FIG. 2, a third light emitter 20 and a third detector 25 may be provided to improve detection and measurement in three dimensions of acceleration of the chamber as determined by movement of the ball 14. With three emitters and detectors, the acceleration of the ball 14 within the chamber 12 is more easily calculated and the relative location of the ball 14 may be determined by simple calculation.

Figure 3:
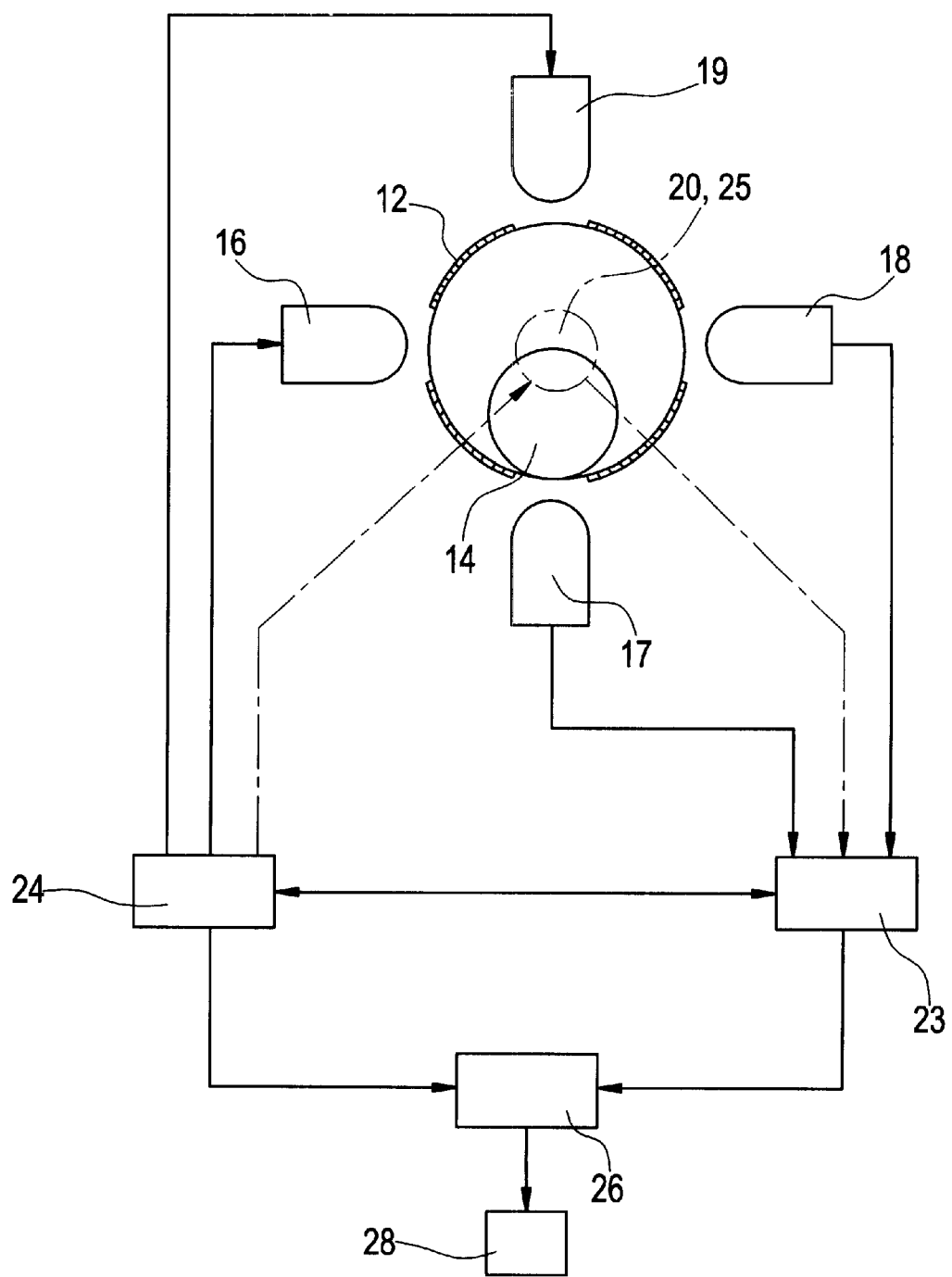
FIG. 3 is a block diagram of an electrical circuit associated with the detector of FIG. 1.

Referring to FIG. 3, the outputs from the detectors 17 and 18 and 25 (if present) are received at a comparator 23 which compares the respective outputs with the inputs as determined by the input circuit 24 in relation to the emitters 16, 19 and 20 (if present). A calculator 26 is able to determine the relative position of the ball 14 by the compared results and is also able to determine a direction of relative movement of the ball 14 by timed comparisons to thereby signal an alarm circuit 28, or any other output circuit, when predetermined thresholds have been reached or exceeded.

While the invention has been described with reference to a spherical chamber having transparent windows in the wall thereof, it will be appreciated that the chamber may be of other shapes, such as ellipsoidal or non-regular shapes. Also, the wall of the chamber may be of a material through which the radiation passes thus obviating the need for radiation transparent windows. Thus, a translucent synthetic plastics material may be used for the chamber wall and which allows the transmission of infra-red radiation.

To avoid errors arising from radiation reflected from the ball 14 and impinging on a detector other than that towards which the radiation was directed, the radiation emitted from the emitters may be of different frequencies, or have other characteristics whereby the specific radiation from each emitter can be identified. In addition, or as an alternative, the surface of the ball 14 may be formed of a material or in such a manner as to prevent or minimize reflection of emitted radiation. Similarly, the internal surface of the wall of the chamber 12 may also be formed of a material or in a manner so as to minimize or prevent reflection of radiation which impinges thereon.

The movement sensor of the invention may be used for any movement detecting purpose, such as in an alarm system for a motor vehicle, such as an automobile or motorbike. The sensor of the invention is particularly suitable for vehicle movement detectors as the security system can be actuated with the vehicle in any orientation relative to the horizontal and, on actuation, the system will sense the relative position of the ball 14 within the chamber 12 at the time of actuation. This will be the "at-rest" position of the ball 14. Any subsequent movement of the chamber which causes relative movement of the ball therein will then be detected by the variation in detected radiation at the two detectors 17 and 18.

It will be appreciated that a movement sensor in accordance with the invention may be constructed using a single pair of emitter and detector. An alarm system operated by a movement detector of the invention may be calibrated to allow for varying degrees of sensitivity to take account of vibrations and the like which might otherwise cause relatively minor acceleration of the ball 14 within the chamber 12.

Any form of radiation may be used in the -performance of the invention, including microwave radiation and the like.

The electrical circuitry associated with the detector of the invention may also compute the angle, direction or distance travelled by a chamber 12 by determining the acceleration of the chamber over a given period of time.

What is claimed is:

1. An omni-directional movement sensor comprising:
    a chamber containing a non-liquid, substantially spherical body freely movable within the chamber, wherein said body does not significantly deform under normal operation of the sensor;
    a first radiation emitting means located relative to the chamber, said emitting means being adapted to emit a beam of radiation which passes through the chamber, said radiation beam having a maximum beam width less than the diameter of the chamber,
    a second radiation emitting means located relative to the chamber and adapted to emit a second radiation beam which passes through the chamber, said second radiation beam having a maximum beam width less than the diameter of the chamber,
    first and second radiation detecting means located substantially opposite said respective first and second emitting means, said detecting means adapted to detect emitted radiation passing through the chamber from the respective emitting means, the body blocking a predetermined amount of the first and second radiation beam dependent on the relative position of the body within the chamber, and
    signal generating means to generate an electrical signal in response to detected emitted radiation.

2. A sensor according to claim 1 further comprising a third radiation detecting means, said third emitting means adapted to emit a beam of radiation substantially at right angles to said first and second beams.

3. A sensor accordingly to claim 1 wherein said radiation is light in the visible spectrum.

4. A sensor according to claim 1 wherein said radiation is infra-red radiation.

5. A sensor according to claim 1 wherein each said radiation beam passing through said chamber is a substantially parallel beam.

6. A sensor according to claim 1 wherein said signal generating means generates an electrical signal which is a function of the amount of radiation detected.

7. A sensor according to claim 6 wherein the signal generating means is associated with each detecting means.

8. A sensor according to claim 1 wherein said chamber is spherical.

9. A sensor according to claim 8 wherein said chamber is at least partially evacuated.

10. A sensor according to claim 1 wherein said radiation from said emitters passes through windows in the chamber wall which windows are transparent to said radiation.

11. A sensor according to claim 1 wherein said chamber has a wall of a material which is transparent to the radiation.

12. A sensor according to claim 11 wherein the chamber wall is coated with or formed of material or is otherwise formed or treated to reduce or prevent reflection of radiation impinging thereon.

13. A sensor according to claim 1 wherein the first and second emitting means emit radiation of different frequencies.

14. A sensor according to claim 1 wherein the surface of the body is coated with or formed of material or is otherwise formed or treated to reduce or prevent reflection of radiation impinging thereon.

15. A sensor according to claim 1
    wherein said body is arranged to block a greater or lesser amount of radiation passing between respective said radiation emitting means and said radiation detecting means as said body moves freely within said chamber.

16. An alarm system for a motor vehicle, the alarm system comprising:
    a movement sensor including:
        a chamber containing a non-liquid, substantially spherical body freely movable within the chamber wherein said body does not significantly deform under normal operation of the sensor,
        a first radiation emitting means located relative to the chamber, said emitting means being adapted to emit a beam of radiation which passes through the chamber, said radiation beam having a maximum beam width less than the diameter of the chamber,
        a second radiation emitting means located relative to the chamber and adapted to emit a second radiation beam which passes through the chamber, said second beam having a maximum beam less than the diameter of the chamber,
        first and second radiation detecting means located substantially opposite said respective first and second emitting means, said detecting means adapted to detect emitted radiation passing through the chamber from the respective emitting means, the body blocking a predetermined amount of the first and second radiation beam dependent on the relative position of the body within the chamber, and
    signal generating means to generate an electrical signal in response to detected emitted radiation.

* * * * *